US006734824B2

(12) United States Patent
Herman (10) Patent No.: US 6,734,824 B2
(45) Date of Patent: May 11, 2004

(54) SYSTEM AND METHOD FOR LOCATING EMITTERS

(75) Inventor: Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/213,708

(22) Filed: Aug. 6, 2002

(65) Prior Publication Data

US 2004/0027276 A1 Feb. 12, 2004

(51) Int. Cl.[7] .............................. G01S 5/02; G01S 13/00
(52) U.S. Cl. ........................... 342/465; 342/20; 342/89; 342/175; 342/176; 342/181; 342/195; 342/450; 342/463
(58) Field of Search .......................... 342/89, 175, 176, 342/181, 195, 385, 386–449, 368, 375, 450–465, 20

(56) References Cited

U.S. PATENT DOCUMENTS

| 2,530,428 | A | | 11/1950 | Gray |
| 2,582,588 | A | | 1/1952 | Fennessy et al. |
| 3,757,340 | A | | 9/1973 | Rogoff |
| 3,864,681 | A | | 2/1975 | Olive |
| 4,215,345 | A | | 7/1980 | MacDoran |
| 4,433,335 | A | | 2/1984 | Wind |
| 4,639,900 | A | | 1/1987 | Gustafson |
| 4,654,648 | A | | 3/1987 | Herrington et al. |
| 5,008,679 | A | | 4/1991 | Effland et al. |
| 5,012,049 | A | | 4/1991 | Schier |
| 5,317,323 | A | | 5/1994 | Kennedy et al. |
| 5,402,348 | A | | 3/1995 | De La Salle et al. |
| 5,406,291 | A | | 4/1995 | Guerci et al. |
| 5,454,720 | A | | 10/1995 | FitzGerald et al. |
| 5,592,181 | A | | 1/1997 | Cai et al. |
| 5,629,707 | A | | 5/1997 | Heuvel et al. |
| 5,646,632 | A | * | 7/1997 | Khan et al. .................. 342/375 |
| 5,742,635 | A | | 4/1998 | Sanderford, Jr. |
| 5,883,598 | A | | 3/1999 | Parl et al. |
| 5,900,838 | A | * | 5/1999 | Khan et al. .................. 342/457 |
| 5,914,687 | A | | 6/1999 | Rose |
| 6,239,748 | B1 | * | 5/2001 | Gilhousen .................... 342/442 |
| 6,433,740 | B1 | * | 8/2002 | Gilhousen .................... 342/442 |

* cited by examiner

*Primary Examiner*—Bernarr E. Gregory
(74) *Attorney, Agent, or Firm*—Tarolli, Sundheim, Covell & Tummino L.L.P.

(57) ABSTRACT

A method for determining a location of an emitter in a monitored area includes the step of providing an array representative of the monitored area, the array including a plurality of elements. Next, at least one first curve and at least one second curve is provided in the array. The first and second curves are representative of possible locations of the emitter in the monitored area. Then, possible emitter locations are identified at intersections of the first and second curves. The intersections are identified by determining locations in the array where an element having an assigned attribute corresponding to a first curve has a predetermined number of adjacent elements having an assigned attribute corresponding to a second curve.

20 Claims, 9 Drawing Sheets

SYSTEM AND METHOD FOR LOCATING EMITTERS

FIELD OF THE INVENTION

The present invention relates to a system and method for determining the location of emitters.

BACKGROUND OF THE INVENTION

Determining the location of emitters of electromagnetic ("EM") radiation in a monitored area, especially multiple emitters in an area, is a matter of interest in many applications, such as military or security applications. In one such application, it is desirable to determine the location of EM emitters in a monitored geographic area. Known methods for determining the location of EM emitters involve collecting electromagnetic radiation data simultaneously at a plurality of EM receiver platform sites having known locations in the monitored area. The EM data collected at the EM receiver platforms may be filtered in order to isolate a particular frequency range of interest.

Known methods determine the time difference of arrival ("TDOA") and/or frequency difference of arrival ("FDOA") of the electromagnetic radiation data collected at the EM receiver platforms. TDOA relates to the time shift in receiving the EM data at the various EM receiver platforms. TDOA results from, among other things, differences in the signal path length between the emitters and receivers and differences in signal propagation mediums. FDOA relates to a frequency shift or Doppler shift in the EM data received at the various EM receiver platforms. FDOA results from, among other things, movement of the emitters and/or receivers.

In the methods set forth above, TDOA and/or FDOA data collected at two EM receiver platforms is used to generate a three-dimensional contour representative of the EM radiation in the monitored area of interest. The number of generated contours can be increased by increasing the number of EM receivers used to collect the data. For example, if there are three EM receivers (e.g., receivers A, B, and C), a first surface can be generated using TDOA/FDOA data collected at receivers A and B, a second surface can be generated using TDOA/FDOA data collected at receivers B and C, and a third surface can be generated using TDOA/FDOA data collected at receivers A and C.

In the contours, time shift ($\tau$) and frequency shift ($v$) are typically represented on the horizontal axes and the magnitude of the detected electromagnetic radiation is represented on the vertical axis. If there is no FDOA (i.e., if the emitters and receivers are stationary), then the frequency shift ($v$) is zero. "Peaks" on the contour having an EM radiation level above a predetermined threshold are determined to be indicative of EM emitters. The predetermined threshold is determined as a function of electromagnetic noise levels in the geographic area of interest. Electromagnetic noise is a function of a variety of factors, such as the number of EM emitters in the monitored area of interest.

The peaks on the contour are located using known mathematical routines. Once a peak is found, the TDOA/FDOA information relating to the peaks can be determined from the contour and recorded. Thus, in the example set forth above, TDOA/FDOA data for potential EM emitters is determined from each of the three generated contours.

In order to determine the location of the EM emitters, the TDOA/FDOA data for each contour is reduced to two-dimensions wherein XY positions are mapped to correspond to the monitored area of interest (e.g., latitude and longitude). The TDOA/FDOA data recorded from the contours is used to calculate curves indicative of constant time and/or frequency paths for each potential emitter. If there is no frequency shift (i.e., FDOA=0), the curve is purely a constant time path curve, which takes the form of a hyperbola.

In the example set forth above, three sets of curves (one for each of contours A-B, B-C, and C-A) would be calculated. In each set of curves, there would be a constant time/frequency path curve for each EM emitter. In order to determine the EM emitter locations, curves calculated using data from two of the contours (e.g., contours A-B and B-C) are compared mathematically to determine where the curves intersect.

Locations where the curves for a particular EM emitter intersect each other indicate potential EM emitter locations. However, when multiple EM emitters are encountered, "ghost" locations are generated in addition to the real EM emitter locations. Ghost locations occur where curves intersect but no EM emitter is located. This occurs when the curve for a particular EM emitter generated by one receiver pair intersects a curve for a different EM emitter that is generated by another receiver pair. It will be appreciated that the number of ghost locations increases exponentially as the number of EM emitters in the monitored area increases.

In order to eliminate ghost locations, the intersections determined from the first two contours (A-B and B-C) are compared with the curves generated from the remaining contour (contour C-A). Locations where the curves generated from contour C-A intersect the intersections determined from contours A-B and B-C help isolate the "real" EM emitter locations from the ghost locations.

The mathematical calculations used to determine curve intersections can become extremely complex, especially where there is both a time shift ($\tau$) and a frequency shift ($v$) in the EM data. Increases in the number of EM emitters and, thus, noise in the monitored area also increases the mathematical complexity of the operation. Such complexity is undesirable for obvious reasons, such as processing speed, system expense, etc.

SUMMARY OF THE INVENTION

The present invention is directed to a system and method for determining locations of multiple emitters. According to the present invention, the intersection of constant time and/or frequency path curves are determined by providing the curves in an array and systematically analyzing assigned attributes for the elements in the array to determine the location of any intersections. In an example embodiment of the present invention, the array comprises a graphical image array including a plurality of elements in the form of pixels. In the example embodiment, the intersections of the constant time and/or frequency path curves are determined graphically by analyzing the arrangement of the pixels in the graphical image.

The constant time and/or frequency path curves are determined from data collected by two or more different EM receiver pairs. The constant time and/or frequency path curves generated by each EM receiver pair are assigned an attribute, such as color, that is unique to that pair. The curves are provided in the graphical array with the unique attribute (color) being assigned to each pixel along the curve.

In the example embodiment of the present invention, the pixels in the graphical image are scanned systematically. An intersection is determined when a pixel having an assigned attribute (color) indicative of one EM receiver pair is positioned adjacent to a predetermined number of pixels having an assigned attribute (color) indicative of another EM receiver pair.

According to one aspect of the present invention, a method for determining a location of an emitter in a monitored area includes the step of providing an array representative of the monitored area. The array includes a plurality of elements. Next, at least one first and second curves are provided in the array. The first and second curves are representative of possible locations of the emitter in the monitored area. Then, possible emitter locations are identified at intersections of the first and second curves. The intersections are identified by determining locations in the array where an element having an assigned attribute corresponding to the first curve has a predetermined number of adjacent elements having an assigned attribute corresponding to the second curve.

According to another aspect of the present invention, a computer product is operative to determine a location of an emitter in a monitored area. The computer includes a portion for providing an array representative of the monitored area. The array includes a plurality of elements. The computer product includes another portion for providing at least one first and second curves in the array. The first and second curves are representative of possible locations of the emitter in the monitored area. Another portion of the computer product identifies possible emitter locations at intersections of the first and second curves. The portion identifies the intersections by determining locations in the array where an element having an assigned attribute corresponding to the first curve has a predetermined number of adjacent elements having an assigned attribute corresponding to the second curve.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF AN EXAMPLE EMBODIMENT

The present invention relates to a system and method for determining multiple emitter locations in a monitored area. In an example embodiment of the present invention, the system and method determine the geographic location of emitters of electromagnetic ("EM") radiation. Those skilled in the art, however, will appreciate that the present invention may be adapted to determine the location of emitters of other emission types.

The present invention determines constant time and/or frequency path curves using a plurality of EM receiver pairs and then determines the location of the EM emitters at intersections of the curves. The intersections are determined by providing the curves in an array and systematically analyzing assigned attributes for the elements in the array to determine the location of any intersections. In the example embodiment of the present invention, the array comprises an array in the form of a graphical image that includes a plurality of elements in the form of pixels.

The method for determining the location of the EM emitters will be described herein with reference to an example embodiment in which curves are provided in graphical images by assigning color attributes to pixels in the images. The images are then combined to create composite images wherein intersecting curves are indicative of possible EM emitter locations. Pixels in the composite images are then systematically analyzed in order to determine intersection locations based on the color attributes of the pixels in the composite images.

Describing the system and method of the present invention in this manner is advantageous in that the invention is more easily visualized and understood when described in terms of graphical images. Those skilled in the art, however, will appreciate that the system and method described herein above is not limited to the creation and analysis of graphical images. The system and method of the present invention may be implemented in any manner suitable for storing and analyzing an array where each element of the array has at least one definable attribute.

For example, instead of generating and analyzing graphical images consisting of a plurality of pixels having a definable color attribute, the method of the present invention could be implemented by generating and analyzing two-dimensional arrays consisting of a plurality of data elements having assignable attributes. Curves could thus be provided in the arrays by assigning attributes of the data elements to correspond to the curves. The arrays could thus be generated, stored, and processed in computer memory without generating any graphical image(s) representative of the arrays. This may help to reduce the processing/computing power required from the computer platform upon which the method is performed and also may improve processing time. Also, by incorporating arrays that are processed in memory, the resolution at which the EM emitter locations are determined may be enhanced (i.e., the array may include a greater number of elements per unit area of the monitored area). This is because the method would no longer be limited by the processing constraints related to graphical images.

Figure 2A:
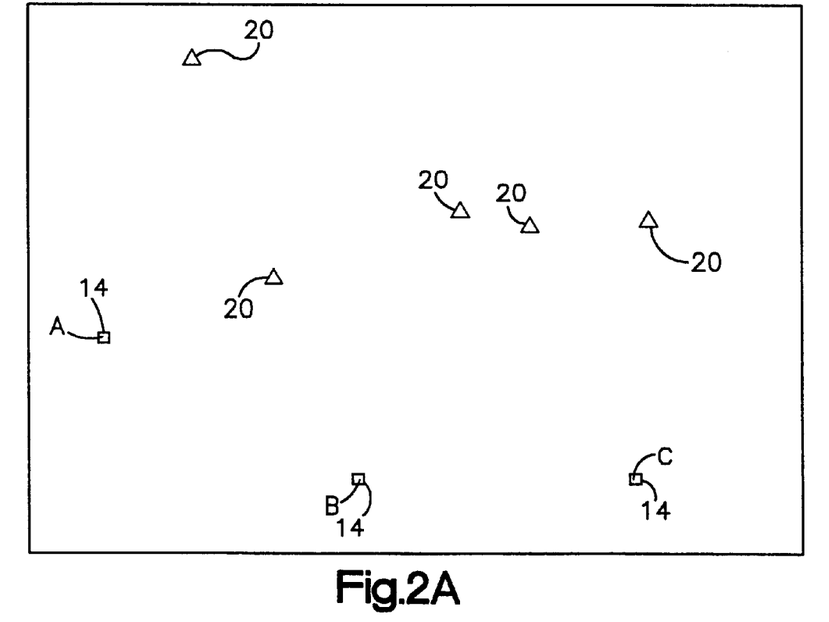
FIGS. 2A–2H are schematic representations of graphical images generated by the process for determining multiple emitter locations of FIG. 1.

A graphical image 10 in accordance with the example embodiment is illustrated in FIG. 2A. The graphical image 10 is a two-dimensional and has X-Y positions capable of being associated, in a known manner, with known locations in a monitored geographic area of interest (e.g., latitude and longitude). Locations on the graphical image 10 are thus capable of being associated with their locations in the geographic area.

For illustrative purposes, the geographic area for the example embodiment may be approximately 400 km$^2$. It will be appreciated, however, that the geographic area may include any desired area. For example, the area may be substantially larger (e.g., continental or intercontinental), or substantially smaller (e.g., a few km² or less). Also, it will be appreciated that the area of interest may not be limited to a geographic area. For example, the area of interest may be celestial or may be a man-made structure, such as an architectural structure.

As illustrated in FIG. 2A, the graphical image 10 depicts three EM receiver platforms 14 having known locations in the geographic area. The EM receiver platforms 14 are identified and will be referred to herein as receiver A, receiver B, and receiver C. Also illustrated in the graphical image 10 are five EM emitters 20. For illustrative purposes, the EM emitters 20 are shown as having a known location in the geographic area. It will be appreciated, however, that the location of the EM emitters 20 would be unknown and would not be shown in the graphical image 10. Also, for purposes of reducing the complexity of the graphical image 10, it may not be necessary to display the EM receiver platforms 14.

The EM receiver platforms 14 are operative to detect EM radiation in a wide range of frequencies selectable by the user. The EM receiver platforms 14 are preferably mobile units that may be hand-carried, vehicle-based, aircraft-based, or even satellite-based. As known in the art, receivers A, B, and C are linked such that EM radiation data recorded at the individual EM receiver platforms 14 can be synchronized chronologically and either analyzed in realtime or stored for future use.

The system and method of the present invention may be embodied as a computer program compilable to provide a computer product (i.e., program) executable to determine multiple emitter locations in the monitored area. Also, the system and method of the present invention may be implemented on any platform of computer hardware and software suitable for receiving and processing EM radiation data from the EM receiver platforms 14. Those skilled in the art will appreciate that such suitable platforms may have a variety of architectures. For example, the system of the present invention may be adapted such that the method for locating multiple EM emitters is performed locally at a central or main one of the EM receiver platforms 14. In this instance, the EM data from the remaining EM receiver platforms 14 would be provided to the central platform, e.g., via remote transmission such as radio or satellite. Alternatively, the system of the present invention may be adapted such that the method for locating multiple EM emitters is performed at a central processing platform (not shown) separate from the EM receiver platforms 14. In this instance, the EM data from the EM receiver platforms 14 would be provided to the central processing platform, such as via radio or satellite transmission. This would allow the EM data to be processed at a position local to or remote from the EM receiver platforms 14.

Figure 1:
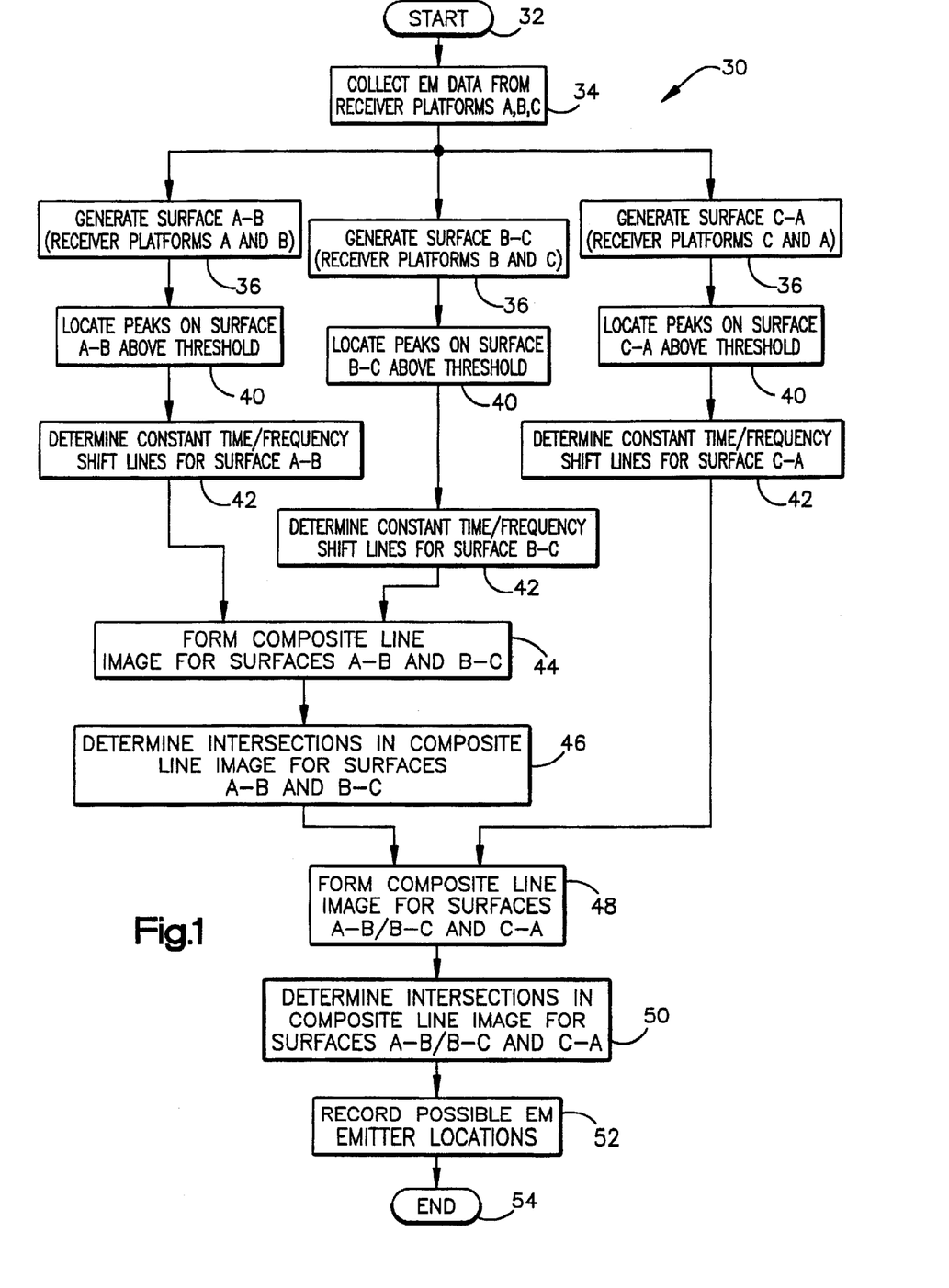
FIG. 1 is a functional block diagram of a process for determining multiple emitter locations, in accordance with an example embodiment of the present invention.

FIG. 1 illustrates a process 30 for determining multiple emitter locations in accordance with the example embodiment of the present invention. In this description of an example embodiment, the use of the word "step" is used to describe functions performed during the process 30. Also, certain steps (e.g., steps 36, 40, and 42) are illustrated in FIG. 1 and described herein as being single steps wherein three separate functions are performed simultaneously. It will be appreciated that the process 30 may perform these functions in any other suitable manner, such as sequentially.

The process 30 begins at step 32 and proceeds to step 34. At step 34, EM data is collected from receivers A, B, and C.

The collection of the EM data at receivers A, B, and C is time-synchronized so that the data collected at the sites can be correlated. The process 30 then proceeds to step 36. At step 36, three-dimensional surfaces are generated in a known manner using the EM data collected EM receiver platform pairs A-B, B-C, and C-A. Each of the platform pairs A-B, B-C, and C-A generates a surface. The surfaces are indicative of the electromagnetic (EM) radiation detected in the area monitored by the EM receiver platform pairs.

Figure 3:
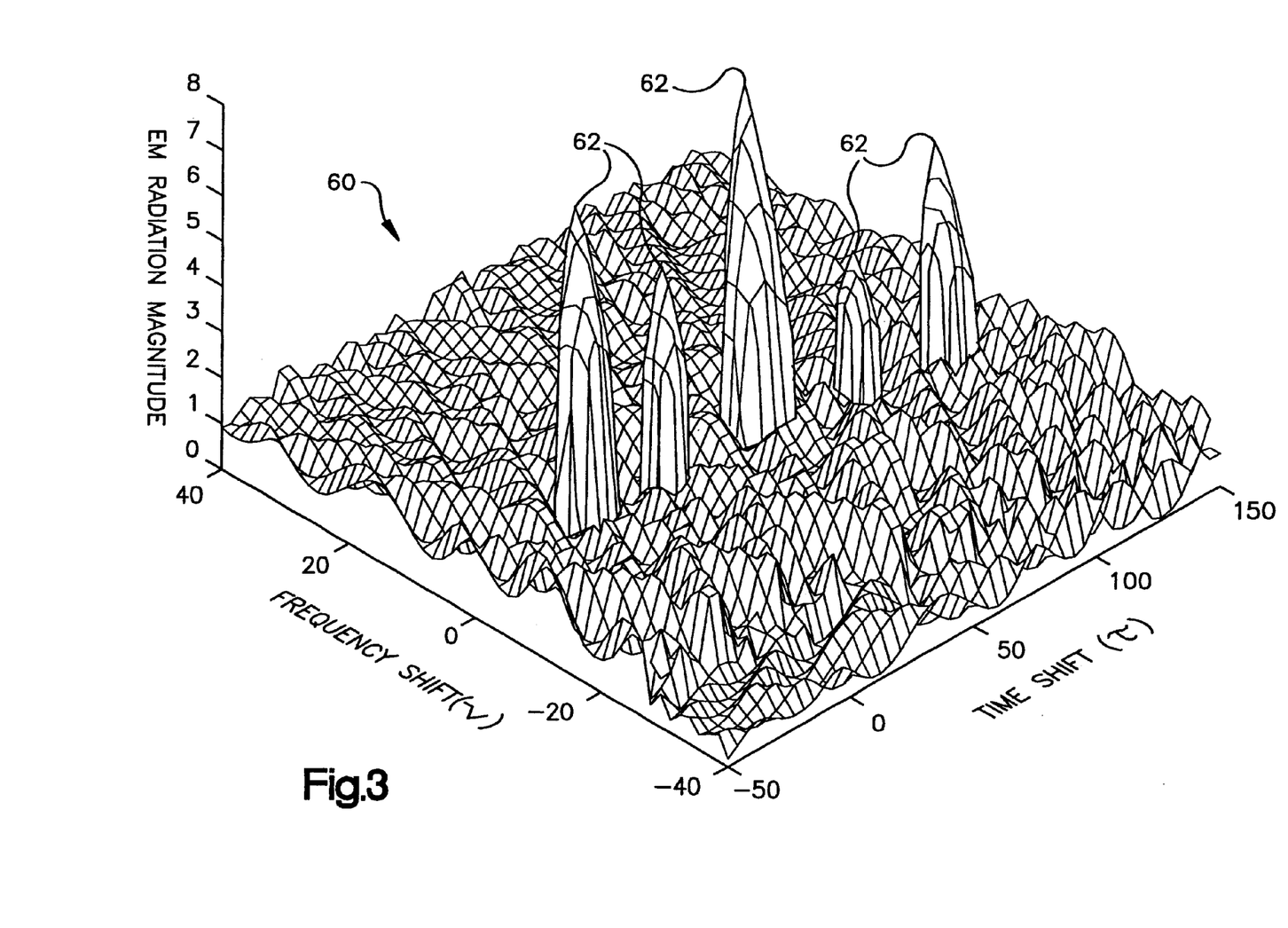
FIG. 3 is a schematic representation of a surface contour generated by the process for determining multiple emitter locations of FIG. 1.

FIG. 3 illustrates an example of a three-dimensional surface 60 generated by one of the EM receiver platform pairs. The vertical axis indicates the level or magnitude of the electromagnetic (EM) radiation detected by the particular platform pair. The time shift, $\tau$, associated with the detected EM radiation is indicated on one horizontal axis. The frequency shift, $\nu$, associated with the detected EM radiation is indicated on the other horizontal axis. Thus, a time shift (TDOA) and a frequency shift (FDOA) may be associated with the level of EM radiation at any particular location on the surface 60.

Those skilled in the art will appreciate that the area monitored by the EM receiver platform pairs may detect EM noise in the area. Referring to the surface 60 of FIG. 3, this EM noise is indicated by the general "roughness" of the surface 60. The level of EM noise, i.e., the roughness of the surface 60 may vary greatly depending on a variety of factors such as the number of EM emitters in the monitored area. Therefore, in order to identify EM radiation on the surface 60 that is produced by an EM emitter, the EM radiation produced by the emitter must exceed a threshold level determined by the amount of EM noise in the monitored area.

In FIG. 3, there are five peaks 62 on the surface 60 where the level of EM radiation detected by the EM receiver platform pair clearly exceeds the EM noise level of the monitored area. These five peaks 62 correspond to the five EM emitters 20 (FIG. 2A) in the geographic area. As illustrated in FIG. 3, the peaks 62 have a frequency shift $\nu$ equal to zero. Thus, in the example embodiment, the EM receiver platforms 14 and the EM emitters 20 are all considered stationary. Once the surfaces for the EM receiver platform pairs are generated, the process 30 proceeds to step 40.

At step 40, locations of the peaks on each of the surfaces generated by the EM receiver platform pairs that exceed the threshold EM noise levels are determined. By "location" of the peaks, it is meant to determine the location of the summit of the peak. One method for determining the locations of the peaks is described in co-pending U.S. patent application Ser. No. 10/213,416, filed Aug. 6, 2002, entitled "SYSTEM AND METHOD FOR LOCATING MULTIPLE PEAK SUMMITS IN THREE-DIMENSIONAL DATA," and is hereby fully incorporated by reference. Other means, such as mathematical algorithms, curve fitting, interpolation, etc. may also be used to determine the locations of the peaks at step 40. Once the location of a peak is determined, the time shift $\tau$, frequency shift $\nu$, and EM radiation magnitude associated with the peak is recorded. When all of the peaks above the threshold are located and the associated data is recorded, the process 30 proceeds to step 42.

At step 42, curves of constant time shift $\tau$ and/or frequency shift $\nu$ for the peaks 62 of each surface 60 are provided in the two-dimensional array, i.e., in the image 10. In the example embodiment, the EM receivers 14 and the EM emitters 20 are stationary. Thus, at step 42, constant time shift curves are provided in the image 10 for the peaks 62.

Figure 2B:
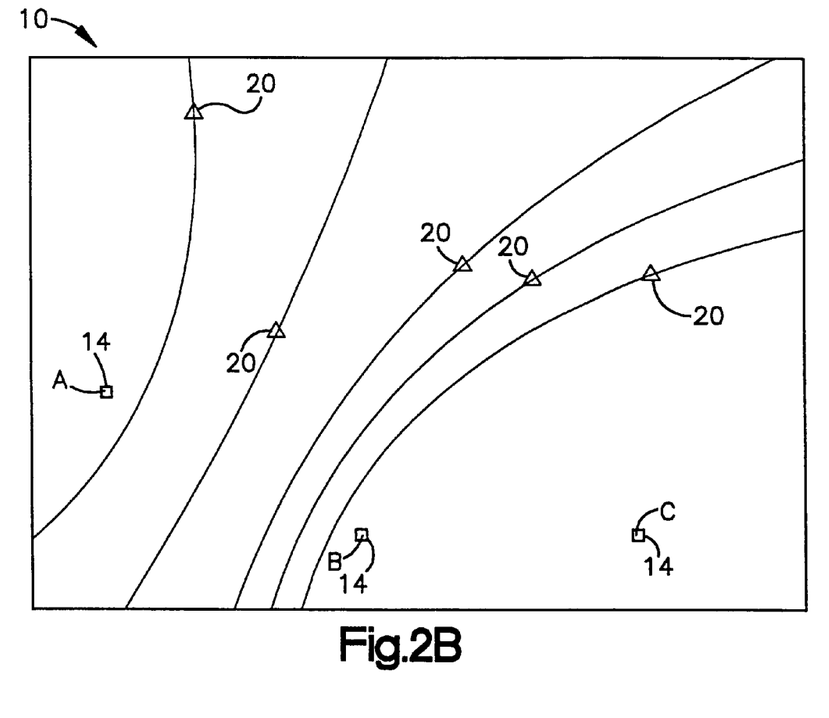
Figure 2C:
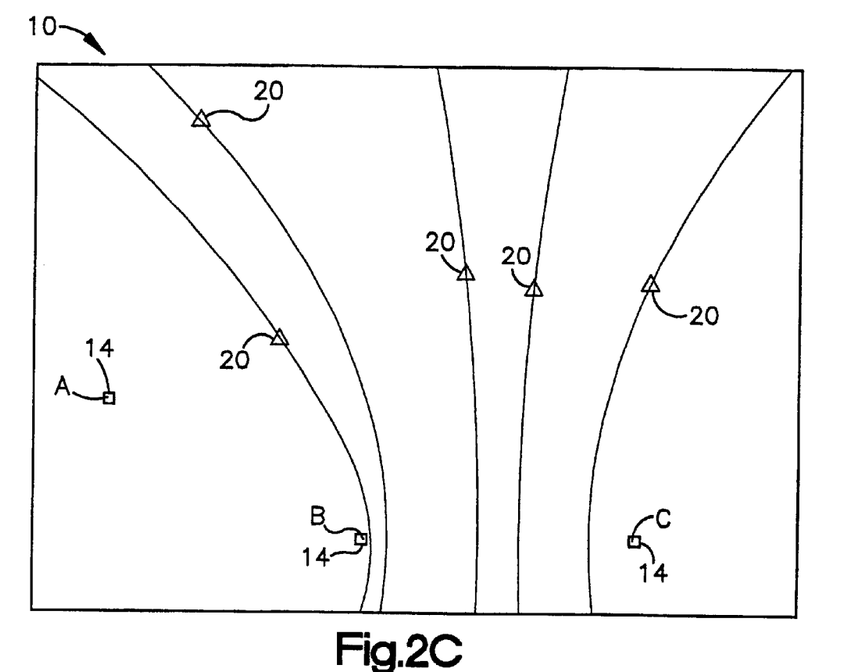
Figure 2D:
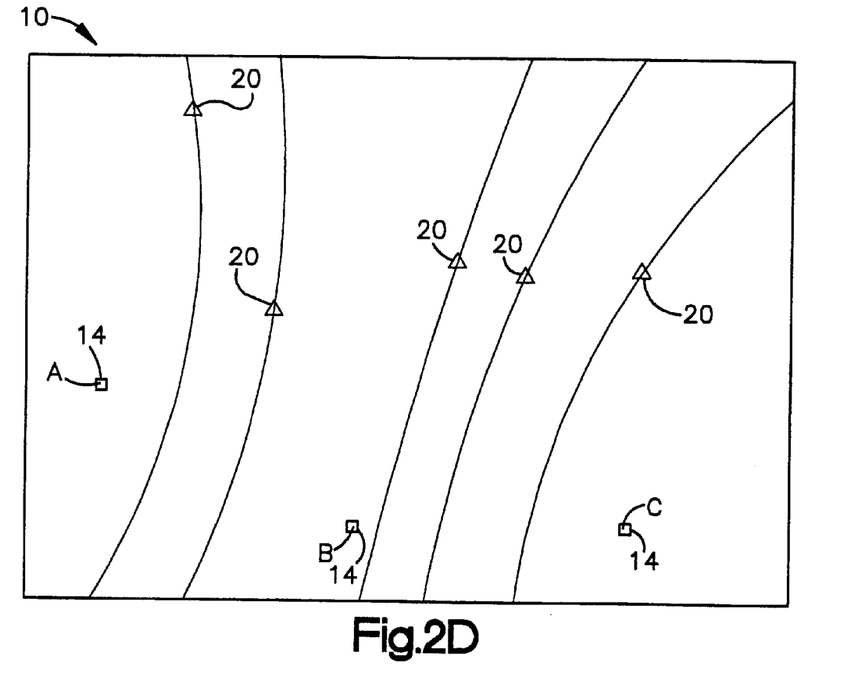

Those skilled in the art will appreciate that constant time shift curves take the form of hyperbolas. The constant time shift curves (hyperbolas) for EM receiver platform pairs A-B, B-C, and C-A are illustrated in FIGS. 2B–2D, respectively. Note that in FIGS. 2B–2D, each EM emitter location 20 is intersected by a constant time shift hyperbola. Once the curves of constant time shift and/or frequency shift are provided in step 42, the process 30 proceeds to step 44.

Figure 2E:
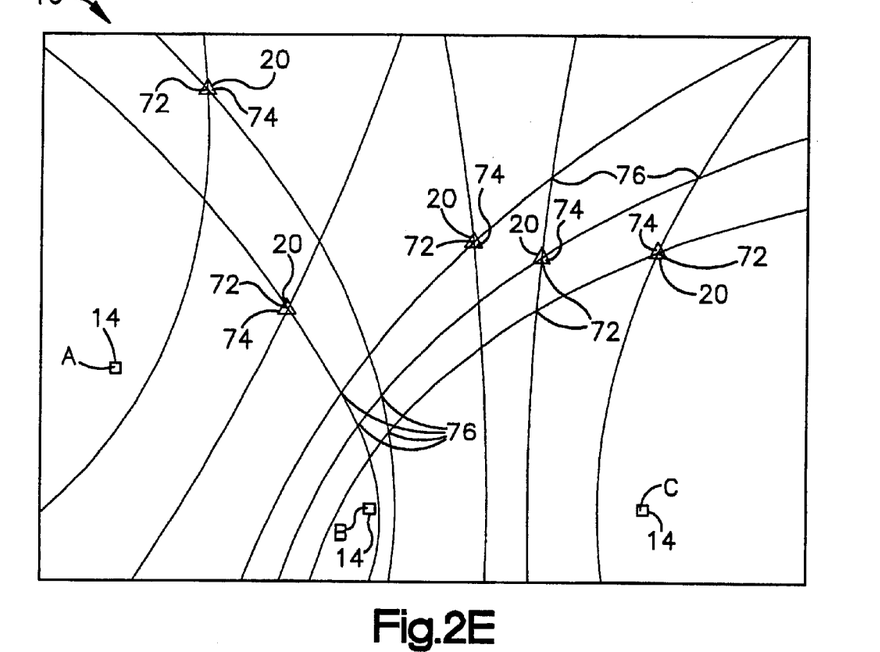

At step 44, the curves of constant time shift and/or frequency shift for surfaces A-B and B-C are combined to form a composite graphical image. In the example embodiment, the constant time shift hyperbolas for surfaces A-B and B-C are combined to form a composite graphical image 70 illustrated in FIG. 2E. As shown in FIG. 2E, the constant time shift hyperbolas intersect each other at a plurality of intersections 72. Among these intersections 72 are actual emitter locations 74 where the EM emitters 20 are located, and "ghost" locations 76, where the hyperbolas intersect but no emitter is located. The composite image 70 of FIG. 2E thus provides a solution set containing possible locations (i.e., intersections 72) of the EM emitters 20. This solution set is illustrated more clearly in FIG. 2F.

Figure 2F:
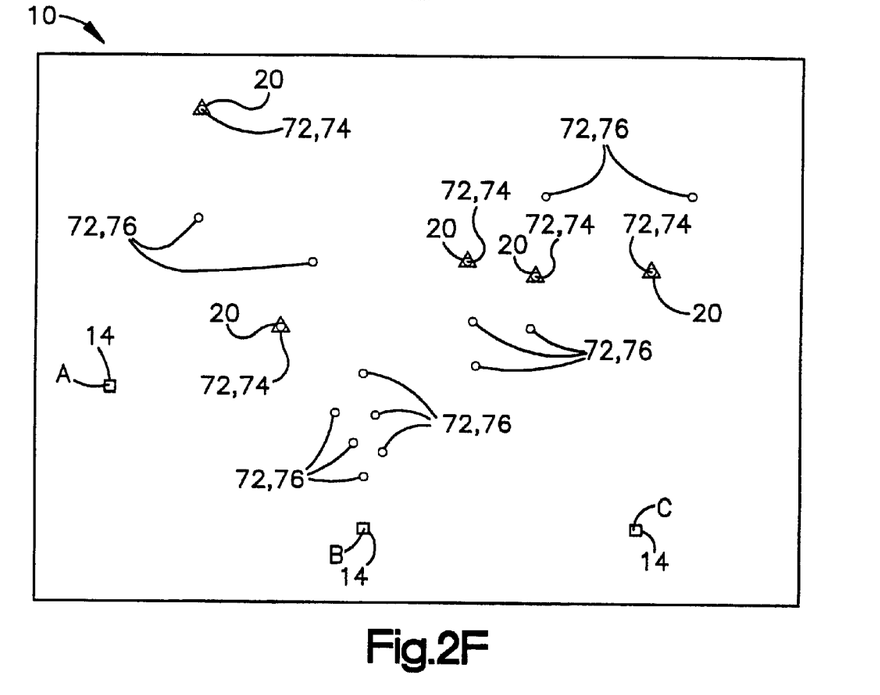

Referring to FIG. 2F, the intersections 72 are illustrated graphically with circles. FIG. 2F thus represents a solution set including the intersections 72 of FIG. 2E. As shown in FIG. 2F, the number of ghost locations 76 greatly outnumbers the actual emitter locations 74. Furthermore, it will be appreciated that, as the number of EM emitters 20 in the geographic area increases, the number of ghost locations 76 will increase exponentially. Once the composite image 70 is determined at step 44, the process 30 proceeds to step 46.

Figure 4:
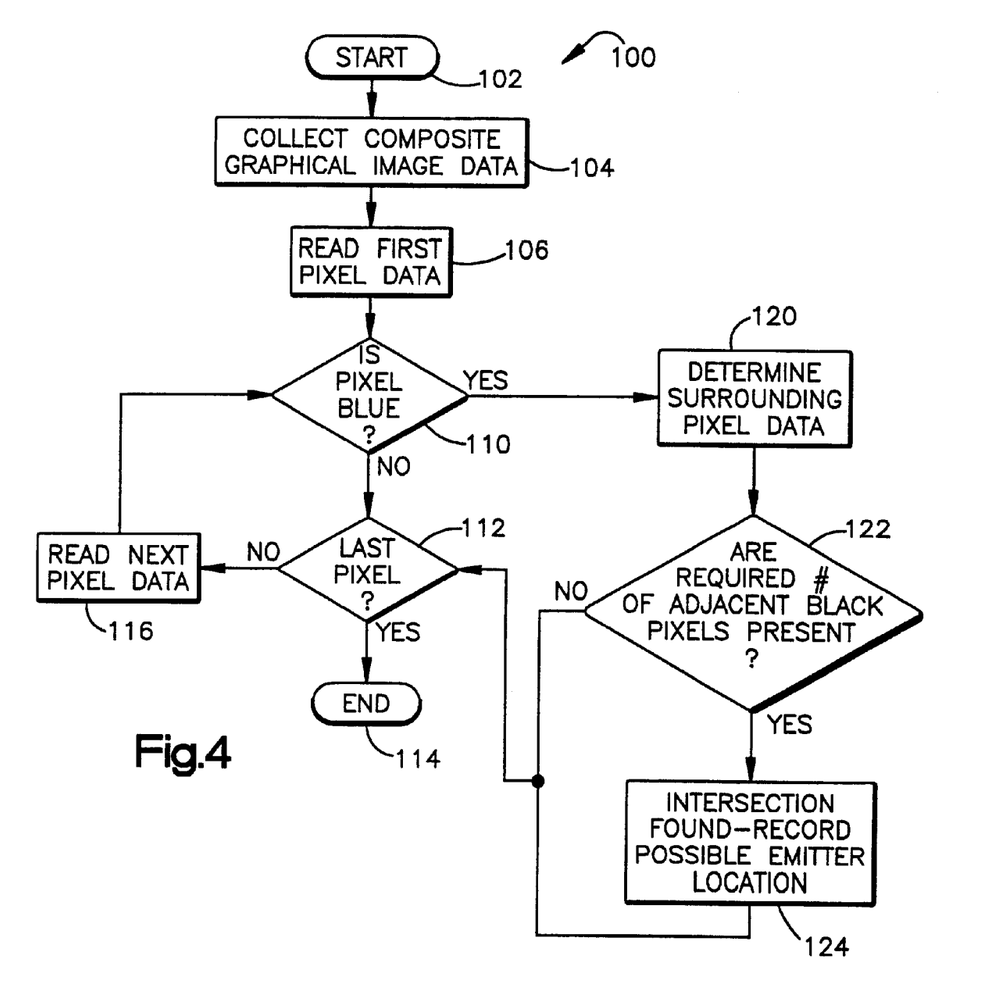
FIG. 4 is a functional block diagram of a first intersection determination process used in the process for determining multiple emitter locations of FIG. 1.

FIG. 4 illustrates a process 100 for determining the location of the intersections 72. The process 100 is performed at step 46 of the process 30 (FIG. 1). According to the example embodiment of the present invention, the process 100 determines the intersections 72 of the curves of constant time shift τ and/or frequency shift ν by systematically analyzing data associated with the pixels that comprise the composite image 70. In general, the intersections 72 are found by stepping sequentially through pixel data for the composite image 70 and determining whether an intersection occurs at each pixel of the image. In this description of an example embodiment, the use of the word "step" is used to describe functions performed during the process 100.

The process 100 begins at step 102 and proceeds to step 104. At step 104, data from the composite image 70 (FIG. 2E) is collected. The image data collected at step 104 includes the location of each pixel and at least one attribute of that pixel that is sufficient for determining whether that pixel forms any part of one or more of the constant time shift hyperbolas. For example, in the example embodiment, one of the constant time shift hyperbolas may be assigned a blue color attribute and the other may be assigned a black color attribute. The background pixels may be assigned a white color attribute. Thus, in the example embodiment, the image data collected at step 104 includes the pixel location (e.g., X-Y position) and the color attribute for each pixel in the composite image 70.

The image data collected at step 104 may be voluminous. For example, a composite image having a resolution of 640×480 pixels (a common computer image size) would produce 307,200 records of data (pixel X-Y position and pixel color). Advantageously, while the image data is voluminous, it is not complex and is therefore relatively easy to evaluate. Once the image data is collected, the process 100 proceeds to step 106.

At step 106, the data relating to the first pixel is read from the data collected in step 104. The pixel data in the composite image 70 may be analyzed in any desired order. Once the first pixel data is read, the process 100 proceeds to step 110.

At step 110, a determination is made as to whether the pixel has a predetermined assigned attribute. In the example embodiment, at step 110, a determination is made as to whether the pixel is blue. If the pixel is not blue, the process 100 proceeds to step 112. At step 112, a determination is made as to whether the current pixel is the last pixel in the composite image 70. If the current pixel is the last pixel, the process 100 is complete and proceeds to step 114, where the process ends. If the current pixel is not the last pixel, the process 100 proceeds to step 116. At step 116, pixel data for the next pixel in the composite image 70 is read from the data collected at step 104. The process 100 then proceeds back to step 110, where a determination is made as to whether the next pixel is blue.

At step 110, if a pixel is determined as being blue, the process 100 proceeds to step 120. At step 120, data relating to pixels which surround the blue pixel is determined. With the exception of the pixels positioned along the edge of the graphical image, each pixel in the image is surrounded by eight adjacent pixels. This is illustrated in FIGS. 5A–D. FIGS. 5A–D illustrate portions 130 of the graphical image that includes sixty four (64) pixels 132 in an eight by eight square. The portions 130 of FIGS. 5A–D each include first and second constant time shift hyperbola curves 134 and 136, respectively. In FIGS. 5A–D, the cross-hatching of the first and second curves 134 and 136 is representative of a blue color attribute and a black color attribute, respectively.

Referring to FIGS. 4 and 5A–D, at step 120, data (X-Y position and pixel color) regarding the pixels surrounding the determined blue pixel is read from the data collected in step 104. For example, referring to FIG. 5A, assume that the determined blue pixel is the pixel identified at 140. The surrounding pixels 132 would include six white (background) pixels, indicated at 142, and two blue pixels, indicated at 144. Once the surrounding pixel data is collected at step 120 (FIG. 4), the process 100 proceeds to step 122.

At step 122, a determination is made as to whether a predetermined number of pixels having a predetermined assigned attribute are positioned adjacent the determined blue pixel. In the example embodiment, a determination is made as to whether a predetermined number of black pixels are positioned adjacent the determined blue pixel. If the predetermined number of black pixels are found adjacent the determined blue pixel, an intersection 72 is determined and the process 100 proceeds to step 124. At step 124, the location of the determined intersection 72 (and thus a possible EM emitter location) is recorded. The process 100 then proceeds to step 112, where a determination as to whether the determined blue pixel is the last pixel, as described above. At step 122, if the required number of adjacent black pixels are not found, the process 100 proceeds to step 112, where a determination is made as to whether the determined blue pixel is the last pixel, as described above.

Preferably, at least two black pixels adjacent the determined blue pixel should be required to indicate an intersection. In step 122, the predetermined number of black pixels required to determine an intersection may vary depending on a variety of factors. To illustrate this point, FIGS. 5A–D show the first and second curves 134 and 136 intersecting each other at different angles. Referring to FIGS. 5A–D, it will be appreciated that the angle at which the first and second curves 134 and 136 intersect each other may affect the determination of the intersection location.

Figure 5A:
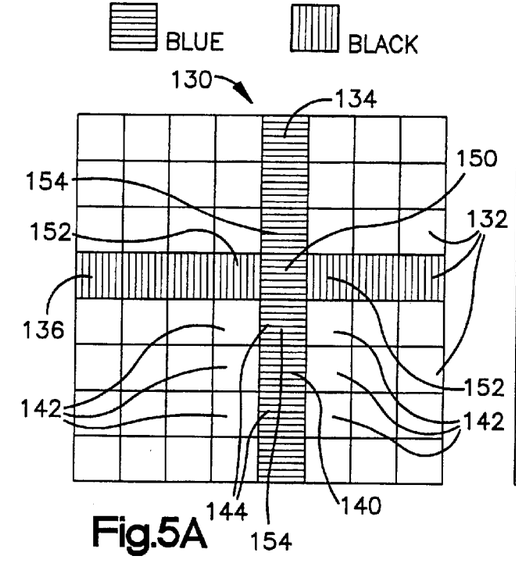
FIGS. 5A–5D are schematic representations of intersecting curves generated by the process for determining multiple emitter locations of FIG. 1.

Referring to FIGS. 4 and 5A, the first and second curves 134 (blue) and 136 (black) intersect each other at a right angle. Thus, in FIG. 5A, an intersection 150 is clearly identifiable at a particular pixel. In FIG. 5A, there are two black pixels 152 adjacent the intersection 150. An intersection, and thus a possible EM emitter location would therefore be recorded at step 124 of the process 100. In FIG. 5A, it will also be appreciated that an intersection, and thus a possible EM emitter location, would also be determined at step 124 for the two blue pixels 154 adjacent the intersection 150. This is because the two black pixels 152 are also positioned adjacent the two blue pixels 154. Thus, in the example of FIG. 5A, the process 100 may determine three possible EM emitter locations for the intersection 150.

The process 100 may be adapted to compensate for the situation where multiple possible EM emitter locations are determined for a single emitter. For example, the process may be adapted to recognize certain predetermined pixel patterns and determine a compensated EM emitter location according to the recognized pattern. Alternatively, the process 100 may be adapted to analyze the adjacent pixels positioned further outward from the intersection to determine the orientation of the intersecting lines. As a further alternative, the process 100 may be adapted to perform a center of mass calculation (e.g., mean of pixel X-positions, mean of pixel Y-positions) to determine a compensated EM emitter location. As shown in the pixel arrangement of FIG. 5A, such a center of mass calculation would determine the intersection 150.

Figure 5B:
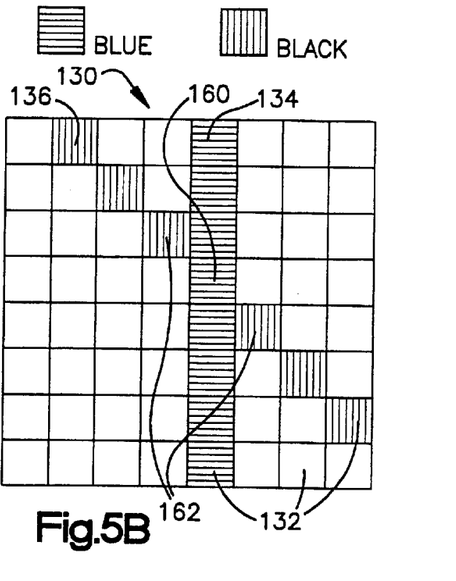

Referring to FIGS. 4 and 5B, the first and second curves 134 (blue) and 136 (black) intersect each other at an acute angle. In FIG. 5B, an intersection 160 is clearly identifiable at a particular pixel. In FIG. 5B, there are two black pixels 162 adjacent the intersection 160. An intersection, and thus a possible EM emitter location would therefore be recorded at step 124 of the process 100. In FIG. 5B, it will also be appreciated that there are no other locations where a blue pixel has a two adjacent black pixels. Thus, in the example of FIG. 5B, the process 100 would determine only one possible EM emitter location for the intersection 150.

Figure 5C:
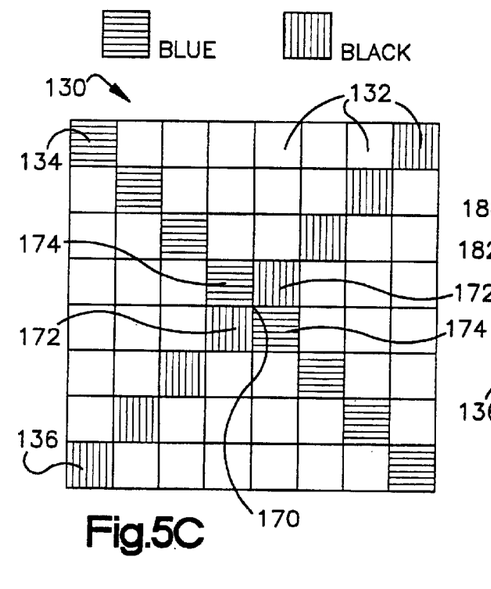

Referring to FIGS. 4 and 5C, the first and second curves 134 (blue) and 136 (black) intersect each other diagonally at a right angle. In FIG. 5C, an intersection 170 is identifiable at the common point of two black pixels 172 and two blue pixels 174. In FIG. 5C, each of the two blue pixels 174 have two adjacent black pixels 172. As a result, both blue pixels 174 would be recorded at step 124 of the process 100 as possible EM emitter locations. Thus, in the example of FIG. 5C, the process 100 would determine two possible EM emitter locations for the intersection 150. The process 100 may be adapted to compensate for this situation in a manner (e.g., pattern recognition, center of mass computation, etc.) as described above in relation to FIG. 5A.

Figure 5D:
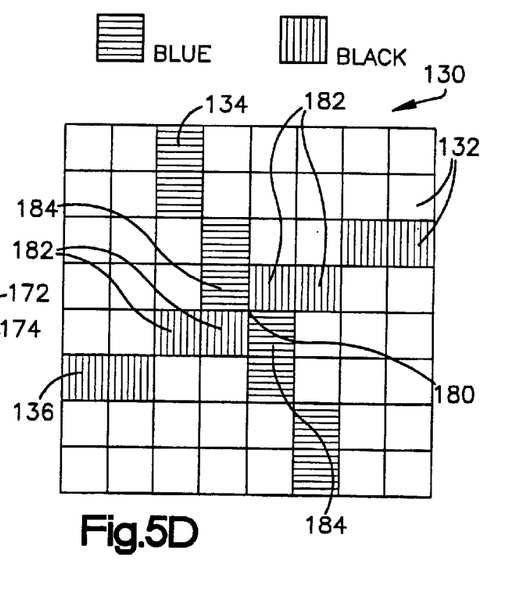

Referring to FIGS. 4 and 5D, the first and second curves 134 (blue) and 136 (black) intersect each other diagonally at an acute angle. In FIG. 5D, an intersection 180 is identifiable at the common point of two black pixels 182 and two blue pixels 184. In FIG. 5D, each of the two blue pixels 184 have three adjacent black pixels 182. As a result, both blue pixels 184 would be recorded at step 124 of the process 100 as possible EM emitter locations. Thus, in the example of FIG. 5D, the process 100 would determine two possible EM emitter locations for the intersection 180. The process 100 may be adapted to compensate for this situation in a manner (e.g., pattern recognition, center of mass computation, etc.) as described above in relation to FIG. 5A.

It will be appreciated that the process 100 for determining the intersections 72 may be sensitive to the order in which the curves 134 (blue) and 136(black) are provided in the composite graphical image 70. For example, pixels common to both a blue and a black curve (e.g., the intersection 150 in FIG. 5A) may be assigned the color of the last curve provided in the graphical image 70. Thus, in the example embodiment, the blue curves would have been provided last. Accordingly, the process 100 may be adapted at step 110 to determine the pixel color of the curves provided last on the composite image 70.

Step 46 of the process 30 for determining multiple emitter locations is thus operable to determine the solution set of FIG. 2F. This solution set includes all of the possible EM emitter locations determined from surface A-B and surface B-C.

Those skilled in the art will appreciate that the degree of precision realized in determining the location of the EM emitters may be affected by a variety of factors, the most significant of which being the amount of EM noise present in the monitored area. The degree of certainty or accuracy associated with EM radiation data collected at the EM receiver platforms 14 (FIGS. 2A–H) may be quantified as a standard deviation $\delta$. The standard deviation $\delta$ is functionally related to the amount of EM noise in the monitored area. Incorporation of the standard deviation $\delta$ serves to provide a means by which to apply a range or tolerance to the discrete locations determined in the process.

For example, if an intersection is determined at a certain pixel, the process may be adapted to determine a possible EM emitter location within a certain radius (see the circles of FIGS. 2F–H) of that pixel, the radius being functionally related to the standard deviation $\delta$. This radius would increase as the amount of EM noise in the area increases. The possible EM emitter location 72 would be adapted to include all of the pixels within the determined radius. As another example, the process may be adapted to provide the curves of constant time and/or frequency shift with a predetermined width or thickness, such as two or more pixels. The width or thickness of these curves would be functionally related to the standard deviation $\delta$. As a further example, standard deviation $\delta$ may also be applied mathematically after the possible EM emitter locations are found.

Figure 2G:
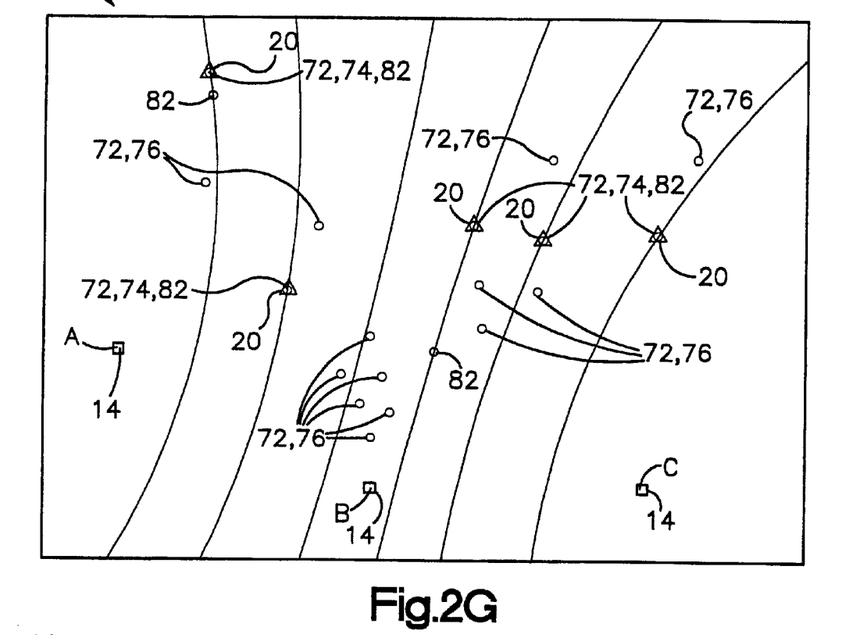

Once the solution set of FIG. 2F is determined, the process 30 proceeds to step 48. At step 48, the solution set of FIG. 2F is combined with the constant time shift hyperbolas for surface C-A (FIG. 2D). This forms a composite graphical image 80 illustrated in FIG. 2G. Referring to FIG. 2G, the constant time shift hyperbolas for surface C-A, when combined with the solution set of FIG. 2F, intersect only certain ones of the previously determined intersections 72. It will be appreciated that the previously determined intersections 72 not intersected by the constant time shift hyperbolas for surface C-A can thus be identified as ghost locations 76 and eliminated from being possible EM emitter locations. The solution set of FIG. 2F is thus narrowed to the solution set of possible EM emitter locations illustrated in FIG. 2H.

Figure 2H:
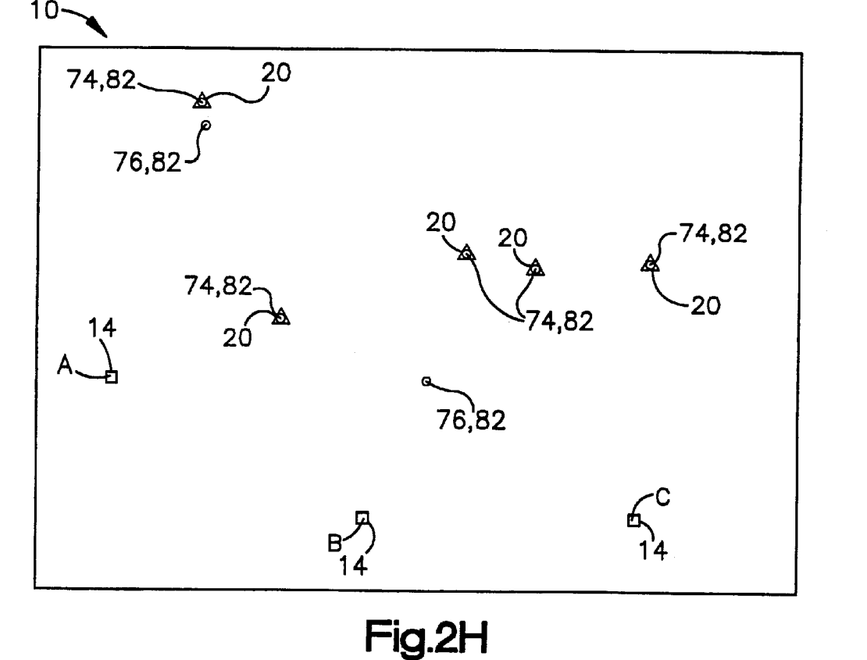

Referring to FIG. 2H, the possible EM emitter locations of the narrowed solution set are indicated at 82. It will be appreciated that the narrowed solution set includes all of the actual EM emitter locations 74. The narrowed solution set of FIG. 2H also includes two ghost locations 76, which is far less than the number of ghost locations determined at step 44 (see FIG. 2F). The number of ghost locations 76 could, of course, vary. Once the composite image 80 is determined at step 48, the process 30 proceeds to step 50.

Figure 6:
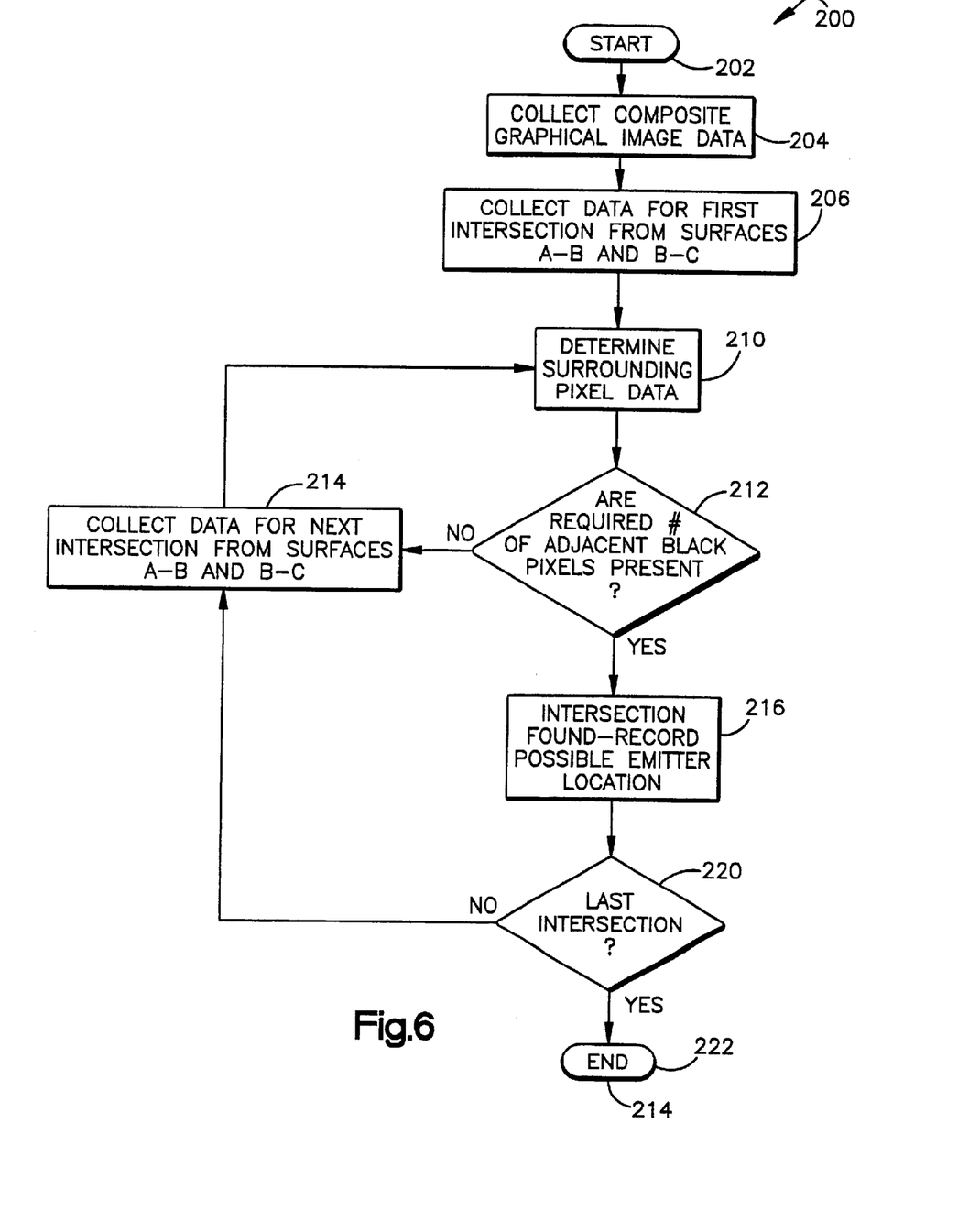
FIG. 6 is a functional block diagram illustrating a second intersection determination processes used in the process for determining multiple emitter locations of FIG. 1.

FIG. 6A illustrates a process 200 for determining the location of the intersections 82. The process 200 is performed at step 50 of the process 30 (FIG. 1). According to the example embodiment of the present invention, the process 200 analyzes data associated with the pixels that comprise the composite image 80 in order to determine the solution set of FIG. 2H.

The process 200 is similar to the process 100 performed at step 46. The process 200 determines locations where the constant time path hyperbola of surface C-A intersects the intersections 72 determined at step 46, whereas the process 100 determines locations where constant time shift hyperbolas of surfaces A-B and B-C intersect each other. In this description of an example embodiment, the use of the word "step" is used to describe functions performed during the process 200.

The process 200 begins at step 202 and proceeds to step 204. At step 204, data from the composite image 80 (FIG. 2E) is collected. The image data collected at step 204 includes the location of each pixel and at least one attribute of that pixel that is sufficient for determining whether that pixel forms any part of the constant time shift hyperbola for receiver pair C-A or the intersections 72. For example, in the example embodiment, the constant time shift hyperbola for receiver pair C-A may be assigned a black color attribute and the intersections 72 may be assigned a blue color attribute. The background pixels may be assigned a white color attribute. Thus, in the example embodiment, the image data collected at step 204 includes the pixel location (e.g., X-Y position) and the color attribute for each pixel in the composite image 80.

As was the case in the process 100 of step 46, the order in which the composite image 80 is assembled may affect the process 200 for determining the locations of the intersections 82. In the example embodiment, the intersections 72 from the solution set of FIG. 2F are provided in the composite image 80 after the constant time shift hyperbolas for surface C-A (FIG. 2D). Thus, the pixels common to both the intersections 82 and the constant time shift hyperbolas for surface C-A would have a blue color attribute.

At step 206, the process 200 collects the data relating to the first intersection 72 from surfaces A-B and B-C. Since these intersections 72 were previously found and recorded at step 124 of the process 100 of step 46 (see FIG. 4), the data relating to the pixel(s) included in these intersections may simply be recalled from memory at step 206. Alternatively, at step 206, a search routine for locating blue pixels, similar to that of the process 100 of FIG. 4, may be used to identify the intersections 72. Once the data for the first intersection 72 from surfaces A-B and B-C is collected, the process 200 proceeds to step 210.

At step 210, data relating to pixels which surround the blue pixel(s) of the intersection 72 is read from the data collected in step 204. Once the surrounding pixel data is collected at step 210, the process 200 proceeds to step 212.

At step 212, a determination is made as to whether a predetermined number of pixels having a predetermined assigned value are positioned adjacent the determined blue pixel(s) of the intersection 72. In the example embodiment, at step 212, a determination is made as to whether there are any black pixels adjacent the of the intersection 72. If the required number of adjacent black pixels are not found, the process 200 proceeds to step 214, where data relating to the next intersection 72 from surfaces A-B and B-C is collected. Once the date for the next intersection 72 is collected at step 214, the process 200 proceeds back to step 210, and continues as described above.

If, at step 212, the predetermined number of black pixels are found adjacent the intersection 72, an intersection 82 is determined and the process 200 proceeds to step 216. At step 216, the location of the determined intersection 82 (and thus a possible EM emitter location) is recorded. The process 200 then proceeds to step 220.

At step 220, a determination is made as to whether the current intersection 72 is the last intersection in the composite image 80. If the current intersection 72 is the last intersection, the process 200 is complete and proceeds to step 222, where the process ends. If the current pixel is not the last pixel, the process 200 proceeds to step 214, where data for the next intersection 72 of the composite image 80 is collected, as described above.

It will be appreciated that, at step 212 of the process 200, the determination of an intersection differs somewhat from the determination made in the process 100 of step 46. For example, unlike the process 100 of step 46, the angle at which the constant time shift hyperbolas for receiver pair C-A intersect the intersections 72 will not greatly affect the determination of the intersections 82 in the process 200 of step 50.

At step 212, if the intersections 72 of the composite image are provided as single pixels (e.g., for a low noise EM environment), then an intersection may be determined when the blue pixel representative of an intersection 72 is positioned on or adjacent a black pixel of a constant time shift hyperbola from surface C-A. Alternatively, if the intersections 72 of the composite image are provided as a groups of pixels having a predetermined radius (e.g., for a high noise EM environment), then an intersection may be determined when any of the blue pixels in a group representative of an intersection 72 is positioned on or adjacent a black pixel of a constant time shift hyperbola from surface C-A. Thus, at step 212, an intersection 82 may be determined where there is only one black pixel adjacent the blue pixel(s) of an intersection 72.

Step 50 of the process 30 for determining multiple emitter locations is thus operable to determine the solution set of FIG. 2H, i.e., the set of possible EM emitter locations. The process 30 then proceeds to step 52, where the determined possible EM emitter locations are recorded. Once the possible EM emitter locations are recorded, the process 30 proceeds to step 54 and ends.

Those skilled in the art will appreciate that the solution set of FIG. 2H could be further reduced, i.e., the number of ghost locations 76 could be further reduced, by incorporating the use of EM receiver platforms 14 in addition to platforms A, B, and C. For example, one additional EM receiver platform (platform D) would add three new unique receiver pair combinations, i.e., receiver pairs A-D, B-D and C-D, which would generate three additional surfaces and, thus, three additional sets of constant time path hyperbolas. These hyperbolas could be combined with the solution set of FIG. 2H to create new composite images. These new composite images could be analyzed in a manner similar or identical to the process 200 of step 50 in order to further reduce the solution set of FIG. 2H.

From the above description of the invention, those skilled in the art will perceive improvements, changes and modifications. Such improvements, changes and modifications within the skill of the art are intended to be covered by the appended claims.

Having described the invention, the following is claimed:

1. A method for determining a location of an emitter in a monitored area, said method comprising the steps of:

providing an array representative of the monitored area, said array including a plurality of elements;

providing at least one first curve and at least one second curve in said array, said at least one first and second curves being representative of possible locations of the emitter in the monitored area; and identifying possible emitter locations at intersections of said at least one first and second curves, said intersections being identified by determining locations in said array where an element having an assigned attribute corresponding to said at least one first curve has a predetermined number of adjacent elements having an assigned attribute corresponding to said at least one second curve.

2. The method as recited in claim 1, wherein said step of providing said at least one first and second curves comprises the steps of:

providing said at least one first curve corresponding to at least one of a constant time delay of arrival value and a constant frequency delay of arrival value associated with an emission of the emitter measured from a first pair of receivers having a known location in the monitored area; and providing said at least one second curve corresponding to at least one of a constant time delay of arrival value and a constant frequency delay of arrival value associated with an emission of the emitter measured from a second pair of receivers different than said first pair of receivers and having a known location in the monitored area.

3. The method as recited in claim 2, wherein said step of providing said at least one first curve further comprises the steps of monitoring emissions from the emitter with said first pair of receivers and determining time and frequency delays of arrival of emissions from the emitter received at said first pair of receivers, said step of providing said at least one second curve further comprising the steps of monitoring emissions from the emitter with said second pair of receivers and determining time and frequency delays of arrival of said emissions from the emitter received at said second pair of receivers.

4. The method as recited in claim 2, further comprising the steps of:

providing at least one third curve in said array corresponding to at least one of a constant time delay of arrival value and a constant frequency delay of arrival value associated with an emission of the emitter measured from a third pair of receivers different than said first and second pairs of receivers and having known locations in the monitored area; and identifying possible emitter locations where said at least one third curve intersects said intersections of said at least one first and second curves, said possible emitter locations being identified by determining locations in said array where an element having an assigned attribute corresponding to said at least one third curve is positioned adjacent a predetermined number of elements associated with said intersections of said at least one first and second curves.

5. The method as recited in claim 4, wherein said step of providing said at least one third curve in said array comprises the step of providing said at least one third curve in a graphical image comprising a plurality of pixels having an assignable color attribute, said at least one third curve being provided in said graphical image by assigning a third color to said color attribute of said pixels along said at least one third curve;

said step of identifying possible emitter locations where said at least one third curve intersects said intersections of said at least one first and second curves comprising the step of determining locations in said graphical image where a pixel assigned a color attribute associated with said intersection of said at least one first and second curves has a predetermined number of adjacent pixels assigned said third color attribute.

6. The method as recited in claim 4, wherein said step of providing said at least one third curve further comprises the steps of monitoring emissions from the emitter with said third pair of receivers and determining time and frequency delays of arrival of emissions from the emitter received at said third pair of receivers.

7. The method as recited in claim 1, wherein each of said elements corresponds to a known location in the monitored area;

said step of providing said at least one first and second curves further comprising the steps of assigning a first value to said assignable attribute of said elements in said array that lie along said at least one first curve, and assigning a second value to said assignable attribute of said elements in said array that lie along said at least one second curve;

said step of identifying possible emitter locations further comprising the step of determining whether an element assigned said first value has a predetermined number of adjacent elements assigned said second value.

8. The method as recited in claim 1, wherein said step of providing an array comprises the step of providing a graphical image, said elements comprising pixels having assignable color attribute, each of said pixels corresponding to a known location in the monitored area.

9. The method as recited in claim 8, wherein said step of providing said at least one first and second curves in said array comprises the step of providing said at least one first and second curves in said graphical image by assigning a first color to said color attribute of said pixels along said at least one first curve and assigning a second color to said color attribute of said pixels along said at least one second curve.

10. The method as recited in claim 9, wherein said step of identifying possible emitter locations at intersections of said at least one first and second curves other comprises the step of determining locations in said graphical image where a pixel assigned said first color attribute has a predetermined number of adjacent pixels assigned said second color attribute.

11. A method for determining a location of at least one emitter in a monitored area, said method comprising the steps of:

providing a graphical image including a plurality of pixels having an assignable color, each of said pixels corresponding to a known location in the monitored area;

providing at least one first curve in said graphical image by assigning a first color to the pixels along said at least one first curve, said at least one first curve being representative of possible locations of the emitter in the monitored area;

providing at least one second curve in said graphical image by assigning a second color to the pixels along said at least one second curve, said at least one second curve being representative of possible locations of the emitter in the monitored area; and identifying possible emitter locations at intersections of said at least one first and second curves, said intersections being identified by determining locations in said graphical image where a pixel assigned said first color is positioned adjacent a predetermined number of pixels assigned said second color.

12. A computer product operative to determine a location of an emitter in a monitored area, said computer product embodied in a computer readable medium and comprising:

a portion for providing an array representative of the monitored area, said array including a plurality of elements;

a portion for providing at least one first curve and at least one second curve in said array, said at least one first and second curves being representative of possible locations of the emitter in the monitored area; and a portion for identifying possible emitter locations at intersections of said at least one first and second curves, said intersections being identified by determining locations in said array where an element having an assigned attribute corresponding to said at least one first curve has a predetermined number of adjacent elements having an assigned attribute corresponding to said at least one second curve.

13. The computer product recited in claim 12, wherein said portion for providing said at least one first and second curves comprises:

a portion for providing said at least one first curve corresponding to at least one of a constant time delay of arrival value and a constant frequency delay of arrival value associated with an emission of the emitter measured from a first pair of receivers having known locations in the monitored area; and a portion for providing said at least one second curve corresponding to at least one of a constant time delay of arrival value and a constant frequency delay of arrival value associated with an emission of the emitter measured from a second pair of receivers different than said first pair of receivers and having known locations in the monitored area.

14. The computer product recited in claim 13, wherein said portion for providing said at least one first curve further comprises a portion for monitoring emissions from the emitter with said first pair of receivers and determining time and frequency delays of arrival of emissions from the emitter received at said first pair of receivers, said portion for providing said at least one second curve further comprising a portion for monitoring emissions from the emitter with said second pair of receivers and determining time and frequency delays of arrival of emissions from the emitter received at said second pair of receivers.

15. The computer product recited in claim 13, further comprising:

a portion for providing at least one third curve in said array corresponding to at least one of a constant time delay of arrival value and a constant frequency delay of arrival value associated with an emission of the emitter measured from a third pair of receivers different than said first and second pairs of receivers and having known locations in the monitored area; and a portion for identifying possible emitter locations where said at least one third curve intersects said intersections of said at least one first and second curves, said possible emitter locations being identified by determining locations in said array where an element having an assigned attribute corresponding to said at least one third curve is positioned adjacent a predetermined number of elements associated with said intersections of said at least one first and second curves.

16. The computer product recited in claim 15, wherein said portion for providing said at least one third curve in said array comprises a portion for providing said at least one third curve in a graphical image comprising a plurality of pixels having an assignable color attribute, said at least one third curve being provided in said graphical image by assigning a third color to said color attribute of said pixels along said at least one third curve;

said portion for identifying possible emitter locations where said at least one third curve intersects said intersections of said at least one first and second curves comprising a portion for determining locations in said graphical image where a pixel assigned a color attribute associated with said intersection of said first and second curves has a predetermined number of adjacent pixels assigned said third color attribute.

17. The computer product recited in claim 15, wherein said portion for providing said at least one third curve further comprises a portion for monitoring emissions from the emitter with said third pair of receivers and determining time and frequency delays of arrival of emissions from the emitter received at said third pair of receivers.

18. The computer product recited in claim 12, wherein each of said elements corresponds to a known location in the monitored area;

said portion for providing said at least one first and second curves further comprising a portion for assigning a first value to said assignable attribute of said elements in said array that lie along said at least one first curve, and a portion for assigning a second value to said assignable attribute of said elements in said array that lie along said at least one second curve;

said portion for identifying possible emitter locations further comprising a portion for determining whether an element assigned said first value has a predetermined number of adjacent elements assigned said second value.

19. The computer product recited in claim 12, wherein said portion for providing an array comprises a portion for providing a graphical image, said elements comprising pixels having assignable color attribute, each of said pixels corresponding to a known location in the monitored area, said portion for providing said at least one first and second curves in said array comprising a portion for providing said at least one first and second curves in said graphical image by assigning a first color to said color attribute of said pixels along said at least one first curve and a portion for assigning a second color to said color attribute of said pixels along said at least one second curve.

20. The computer product recited in claim 19, wherein said portion for identifying possible emitter locations at intersections of said at least one first and second curves comprises a portion for determining locations in said graphical image where a pixel assigned said first color attribute has a predetermined number of adjacent pixels assigned said second color attribute.

* * * * *